United States Patent

[11] 3,575,611

[72] Inventor James R. Reed
Minneapolis, Minn.

[21] Appl. No. 848,646
[22] Filed Aug. 8, 1969
[45] Patented Apr. 20, 1971

[73] Assignee Honeywell Inc.
Minneapolis, Minn.

[54] FREQUENCY TO DIRECT CURRENT CONVERTER
8 Claims, 1 Drawing Fig.

[52] U.S. Cl. .......... 307/233, 328/140, 324/78
[51] Int. Cl. .......... H03b 3/04
[50] Field of Search .......... 328/140, 141; 307/233; 324/78; 258/(Inquired)

[56] References Cited

UNITED STATES PATENTS

| | | | |
|---|---|---|---|
| 3,149,243 | 9/1964 | Garfield .......... | 328/140X |
| 3,187,202 | 6/1965 | Case .......... | 328/140X |

*Primary Examiner*—John S. Heyman
*Attorneys*—Lamont B. Koontz and Francis A. Sirr

ABSTRACT: A first transistor is controlled by an alternating current input signal and is cyclically rendered conductive and nonconductive in accordance with the frequency of the input signal. When the first transistor is nonconductive, a first and a second capacitor are charged by means of a series circuit including a first diode. A second transistor assumes a state of conduction in accordance with the charge of the second capacitor. When the first transistor is conductive, the first capacitor is discharged by means of a circuit including a second diode and the output of the second transistor. A direct current output is provided by the second transistor.

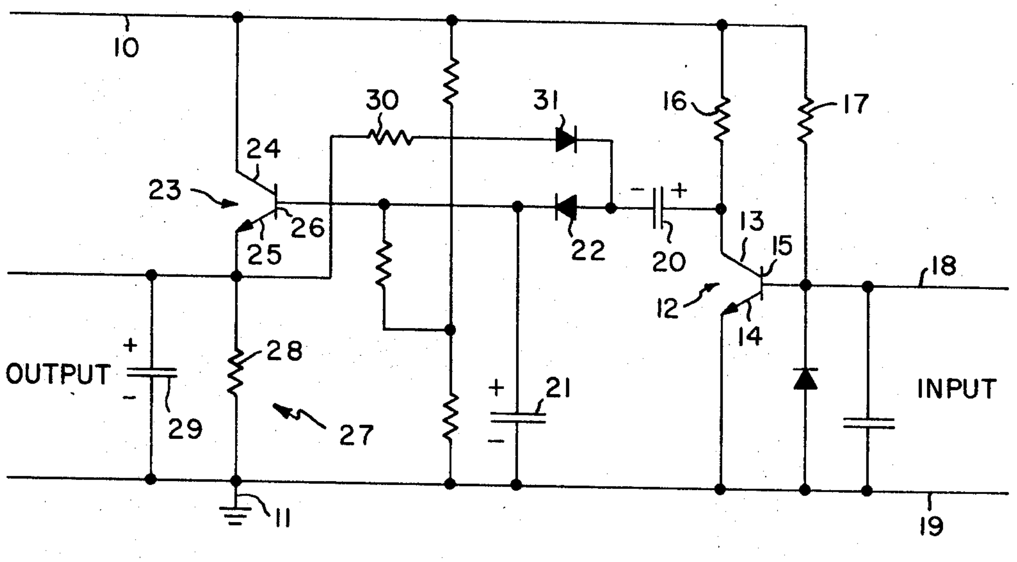
INVENTOR.
JAMES R. REED
BY Francis A. Sirr
ATTORNEY.

FREQUENCY TO DIRECT CURRENT CONVERTER

SUMMARY OF THE INVENTION

This invention provides an improved means of converting a variable frequency alternating current input signal to a variable magnitude direct current output signal.

BRIEF DESCRIPTION OF THE DRAWING

The single FIGURE is a schematic showing of the preferred embodiment of the invention.

DESCRIPTION OF THE PREFERRED EMBODIMENT

Referring to the single FIGURE, the frequency to direct current converter receives energizing or operating voltage from conductor 10. Conductor 10 may be connected to the positive terminal of a 12-volt direct current source, the negative terminal of which is connected to ground or reference potential 11.

A first transistor 12 includes output means in the form of collector 13 and emitter 14, and input means in the form of base 15 and emitter 14. Collector 13 is connected to the positive source of operating voltage through resistor 16 and base 15 receives bias through resistor 17. The input means of transistor 12 is adapted to receive a variable frequency alternating current input signal on conductors 18 and 19. This input signal may be a condition responsive signal whose frequency varies with the condition being sensed. The input signal present on conductors 18 and 19 causes transistor 12 to be conductive during one-half cycle of the input signal and nonconductive during the other half cycle of the input signal. Thus, transistor 12 is cyclically switched between a conductive state and a nonconductive state in accordance with the frequency of the input signal applied to conductors 18 and 19.

When transistor 12 is nonconductive, capacitors 20 and 21 charge through a first series circuit which can be traced from conductor 10 through resistor 16, capacitor 20, diode 22 and capacitor 21 to reference potential 11. From this circuit it can be seen that diode 22 is poled to cause the first and second capacitors to charge, to the polarity indicated, during the half cycle of the input signal in which transistor 12 is in its nonconductive state. Also, it can be seen that the series circuit, consisting of capacitor 20, diode 22 and capacitor 21, is in parallel with the output means 13, 14 of transistor 12. Preferably, capacitor 21 has a higher capacitance value than capacitor 20. For example, capacitor 21 may have a capacitance value of 1 microfarad whereas capacitor 20 has a capacitance value of 0.047 microfarads.

A second transistor 23 has output means in the form of collector 24 and emitter 25, and input means in the form of base 26 and emitter 25. Input means 25, 26 of transistor 23 is connected to be controlled by the charge on capacitor 21 and thus the state of conduction of transistor 23 is determined by the direct current voltage on capacitor 21.

The output circuit of transistor 23 includes an impedance means 27 including a resistor 28 and a parallel connected third capacitor 29. The current which flows in the output means of transistor 23 can be traced from conductor 10 through the collector-to-emitter circuit of transistor 23 and parallel connected resistor 28 and capacitor 29 to reference terminal 11. This current flow causes capacitor 29 to be charged to the polarity indicated. The direct current voltage on capacitor 29 is the output of the frequency to direct current converter.

A second series circuit is effective to discharge capacitor 20 and to recharge this capacitor to a polarity opposite from that shown when transistor 12 is in its conductive state. This second series circuit can be traced from the upper terminal of resistor 28 through resistor 30, a second diode 31, capacitor 20, the output means 13, 14 of transistor 12 to the lower terminal of resistor 28.

Referring again to the above-mentioned first series circuit including capacitor 20, diode 22 and capacitor 21, since capacitor 20 has a lower capacitance value than capacitor 21, current ceases to flow in this first series circuit when capacitor 20 becomes charged. Thus, the amount of energy which is transferred to capacitor 21 is a function of the frequency of the alternating current signal applied to conductors 18 and 19, The higher this frequency, the higher the voltage which appears across the terminals of capacitor 21. This higher voltage across capacitor 21 in turn causes transistor 23 to assume a state wherein a higher current flows in the output 24, 25 of this transistor, to thus cause capacitor 29 to be charged to a higher voltage. Thus, the direct current output voltage existing across capacitor 29 is a function of the frequency of the input signal applied to conductors 18 and 19.

The above-described second series circuit, including resistor 30 and diode 31, is provided to discharge capacitor 20 during a half cycle of the input signal, readying capacitor 20 to be recharged on the next half cycle of the input signal. Transistor 26 is provided to cause capacitor 20 not only to discharge, but also to recharge to the opposite polarity during the half cycle of the input signal in which transistor 12 is conductive. The recharging current which flows in the second series circuit is a function of the state of conduction of transistor 23 as controlled by the charge on capacitor 21. This current can be traced from conductor 10 through the collector-to-emitter circuit of transistor 23, resistor 30, diode 31, capacitor 20 and the collector-to-emitter circuit of transistor 12 to reference potential 11.

The embodiments of the invention in which an exclusive property or right is claimed are defined as follows:

I claim:

1. In a variable frequency-alternating current to variable magnitude direct current converter, the combination comprising:

a first transistor having output means, and having input means adapted to receive a variable frequency-alternating current input and biased to a relatively conductive state during one-half cycle of the input and to a relatively nonconductive state during the other half cycle of the input, a first series circuit of a first capacitor, a first diode and a second capacitor connected to the output means of said first transistor, said first diode being poled to cause said first and second capacitors to charge when said first transistor is in one of said states, a second transistor having output means, and having input means connected to said second capacitor to render said second transistor conductive in accordance with the state of charge of said second capacitor, a second series circuit of the output means of said second transistor, a second diode, said first capacitor and the output means of said first transistor, said second diode being poled to cause current to flow in said second series circuit in a direction to discharge said first capacitor when said first transistor is in the other of said states, and output means connected to said second transistor.

2. A converter as defined in claim 1 wherein said second capacitor has a larger capacitance value than said first capacitor.

3. A converter as defined in claim 1 wherein said one state is the nonconductive state and said other state is the conductive state.

4. A converter as defined in claim 3 wherein said first series circuit is connected in parallel with the output means of said first transistor.

5. A converter as defined in claim 4 wherein the output means of said second transistor includes impedance means having a direct current voltage thereacross whose magnitude varies with the conduction of said second transistor, and wherein said impedance means forms a portion of said second series circuit.

6. A converter as defined in claim 5 wherein said output means includes said impedance means and a parallel connected third capacitor.

7. A converter as defined in claim 6 wherein said impedance means is resistance means.

8. A converter as defined in claim 7 wherein said second capacitor has a larger capacitance value than said first capacitor.